United States Patent Office 3,242,312
Patented Mar. 22, 1966

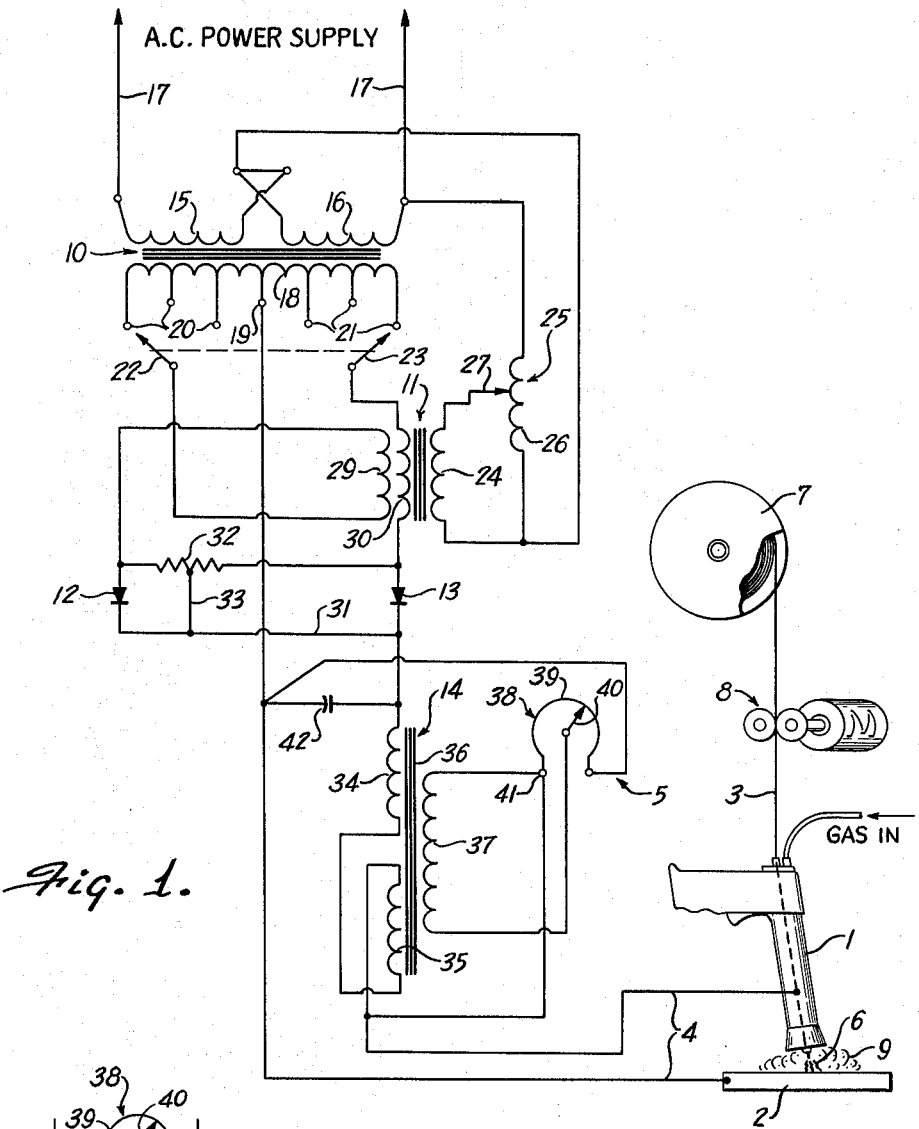
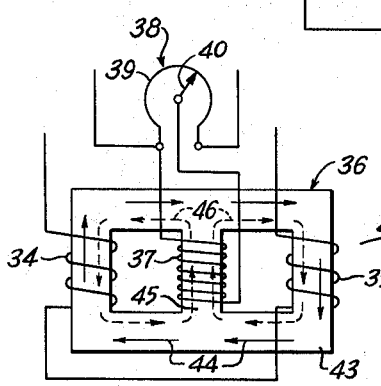

3,242,312
ELECTRICALLY CONTROLLED D.C. POWER SOURCE
Dennis G. Pierce, Elkhorn, Wis., assignor, by mesne assignments, to Harnischfeger Corporation, West Milwaukee, Wis., a corporation of Wisconsin
Filed July 2, 1963, Ser. No. 292,400
11 Claims. (Cl. 219—135)

By this invention relates to an electrically controlled direct current power source particularly for establishing and maintaining an arc for welding and similar arc processes.

Welding with the arc between the work and the electrode enveloped in a shielding gas has been highly developed in recent years. A D.C. (direct current) power source has been found to provide optimum results in many processes. A three phase transformer having the output converted to direct current by a full wave rectifier permits ready control of the welding current by use of a saturable reactor current control in the A.C. (alternating curent) circuit of the transformer.

Gas shielded metal arc welding circuits for arc processes of the spray transfer preferably include an additional control reactance in the direct current output leads to control the arc welding action. Generally, the reactance has been inserted through a mechanical sliding brush arrangement or taps in a reactor unit. The present invention provides an improved control in providing a saturable reactor control unit in the D.C. output leads.

In accordance with the present invention, a direct current welding power source, preferably a constant potential source having output control means, is provided with a saturable reactor means including load windings connected in series in the direct current output of the power source and a saturating control winding. The control winding may be connected to a separate adjustable direct current source but is preferably connected in accordance with the present invention to the direct current output of the welding power source through an adjustable current means. The reactor means adjusts the time to respond to arc voltage changes to provide the exact welding characteristics desired. The electrical control does not include any moving parts carrying high current such as generally present in mechanically controlled inductors. For example, the output voltage can be fed to a potentiometer which in turn provides an adjustable direct current to the D.C. control coil of the saturable reactor. In this system of control, applicant has found that at low values of load current and voltage, a relatively small control power is needed to maintain a stable welding arc. At higher values of load current and voltage, a greater control power is required. Consequently, the derivation of the control power from the output of the direct power source provides a power level directly related to the actual operating requirements.

In accordance with the preferred structure of the present invention, a multiple path magnetic means is provided having a magnetic control path or portion carrying saturating coil means and load current carrying controlled coil means disposed symmetrically with respect to the control portion. The load carrying coil means are connected in series in such a manner to establish a load responsive flux in the same direction in the common path. The core is preferably a solid three legged or path unit without air gap or other magnetic interruption such as normally provided in reactor units for welding and the like. The control coil is placed on the central leg or path while the load windings are placed on the outer legs or paths.

In accordance with another feature of the present invention, a capacitor is connected across the output of the direct current power source. The combination of the capacitor and an arc control reactance means provides instantaneous arc response and produces exceedingly satisfactory arc action in all processes with maximum electrode deposition rate.

A single phase constant potential direct current power source has also been found which in combination with the electrically controlled inductance produces a reliable and inexpensive power supply for arc processes which have heretofore required expensive three-phase systems. The power supply not only reduces the initial equipment costs but reduces installation and maintenance costs. Thus, the present supply is particularly adapted to welding of light gauge with gas shielded arc processes which cannot be economically powered from three phase power.

In accordance with this aspects of the present invention, a constant potential transformer includes a center tapped secondary which is connected in a full wave rectifying circuit of alternately active rectifying units connected one each between the center tap and the opposite ends of the secondary. A tap switch means or the like similarly positions the circuit connections to opposite sides of the center tap. A booster transformer has a primary connected to the incoming power supply and a pair of secondaries connected one each in series with the alternately active rectifying units. The amount of power added by the booster transformer is conveniently controlled by an autotransformer or other suitable voltage control interposed between the incoming power supply and the booster transformer primary.

The present invention thus also provides an improved single phase constant potential power source for arc welding processes and the like. An improved arc action control unit is provided without load current carrying moving parts in the direct current or output circuit and having a continuous, stepless control of the arc.

The drawing furnished herewith illustrates the best mode presently contemplated for carrying out the invention.

In the drawing:

FIG. 1 is a diagrammatic illustration of a direct current welding power arc welding system including a single phase direct current power source and a controlled reactance constructed in accordance with the present invention; and FIG. 2 is an embodiment of the invention showing the direct derivation of the control power from the direct current power source.

Referring to the drawing and particularly to FIG. 1, an arc welding gun 1 is shown positioned with respect to a work member 2 with a consumable welding electrode 3 being fed through the gun. Direct current power leads 4 connect the electrode 3 and the work member 2 to a direct current power source 5 which is adapted to establish and maintain an arc 6 between the work member 2 and the end of electrode 3. The electrode 3 is carried by any suitable supply such as the supply reel 7 and is withdrawn by suitable electrode feed rolls 8 or the like to maintain timed feeding of the electrode 3 in accordance with the burn rate established by the arc 6. A suitable gas shield 9 is provided enveloping the arc 6 from any suitable gas source, not shown.

Although the present invention is a general application type, it provides a highly satisfactory and inexpensive apparatus for light gauge welding in gas shielded arc processes. The structure of the present invention will match the performance of the prior art three phase devices which have generally been employed in such light gauge welding processes.

More particularly, the illustrated power source 5 includes a main single phase transformer 10 in series with a booster transformer 11 and a pair of full wave rectifying elements 12 and 13 interconnected to establish a full wave rectified current supply to the D.C. power leads 4. A saturable magnetic arc control unit 14 forming an important feature of the present invention is connected in one of the leads 4 as hereinafter described.

The illustrated main transformer 10 includes a pair of primary windings 15 and 16 shown connected in series between incoming single phase power lines 17. The pair of primary windings 15 and 16 is provided to allow connection to two different incoming voltages such as the usual 230 volt or 460 volt alternating current supplies. The series connection is provided for a 460 volt incoming power supply. If a 230 volt power supply distribution system is employed, the windings 15 and 16 will be connected in parallel. The transformer 10 further includes a tapped secondary 18 having a fixed center tap 19 connected directly to one of the leads 4 and a plurality of taps 20 and 21 respectively and similarly provided on opposite sides of the center tap 19. Ganged switch arms 22 and 23 respectively engage similar ones of the plurality of taps 20 and 21 and are connected in series with the rectifying elements 12 and 13 to the D.C. leads 4. The ganged connection establishes a corresponding voltage setting between the tap or switch arms 22 and 23 and the center tap 19.

The booster transformer 11 includes a primary winding 24 connected to the primary winding 16 by an autotransformer 25. The latter includes a winding 26 connected in parallel with the primary winding 16 and an adjustable output slider or tap 27. One side of the autotransformer winding 26 is connected in common to the one side of the booster transformer winding 24 and the primary winding 16 and tap 27 is connected to the opposite side of the booster primary winding 24. Adjustment of the tap 27 inserts a selected portion of the voltage of the autotransformer 25 to the booster transformer winding 24 which is electromagnetically coupled to a pair of secondary windings 29 and 30. The booster transformer secondary winding 29 is connected in series between the switch arm 22 and the rectifying element 12 and the booster secondary winding 30 is similarly connected in series with the switch arm 23 and the rectifying element 13. The opposite side of the rectifying elements 12 and 13 are similarly connected by a common lead 31 to the one output lead 4.

The rectifying elements 12 and 13 have the corresponding cathodes connected to arms 22 and 23 and thus are similarly polarized with respect to the secondary windings. The elements 12 and 13 respectively conduct only the opposite half cycles of the input supply. A protective resistor 32 is connected between the cathodes of the rectifying diodes 12 and 13 with a center tap connected by a jumper lead 33 to the common lead 31 and therefore to the anodes of the diodes 12 and 13. The resistor thus provides a parallel circuit across the diodes to protect the diodes against damaging inverse voltages in accordance with known parallel connections.

The saturable magnetic arc control 14 of the present invention includes a pair of load current windings 34 and 35 series connected in the one lead 4. The windings 34 and 35 are carried on a magnetic core 36 and tend to establish flux through the core in a common direction. A saturating control winding 37 is electromagnetically coupled to the windings 34 and 35 by the magnetic core 36 and establishes a control flux opposing the flux of the one winding and aiding the flux of the other winding.

The saturating control winding 37 is energized by a portion of the rectified output of the transformers 10 and 11, as follows. A potentiometer 38 includes a winding 39 connected across the power leads 4 to the arc side of the windings 34 and 35. A tap 40 is connected directly to one side of the winding 37, the opposite side of which is connected to one side of the winding 39 in common with the connection to the power lead 4, as at 41.

A capacitor 42 is connected across the D.C. power lines 4 to the power source side of the saturable magnetic arc control unit 14.

During the operation of the circuit, the capacitor 42 cooperates and interacts with the load windings 34 and 35 of the saturable magnetic arc control unit 14 to provide and constitute an electrically variable inductance-capacitance filter unit providing essentially instantaneous arc response. Applicant has found that with the circuit of the present invention, the arc may be made to respond in .0001 second and thereby maximize the arc action on all processes with a maximum deposition rate and all electrode positions.

The connection of the control winding 37 of the saturable magnetic arc control unit 14 across the output leads 4 provides a direct arc voltage feedback acting as a self-adjusting power source to automatically control for one operating variable and thereby simplifies the setup and operation for various arc processes.

The rheostat or potentiometer 38 provides a simple and continuously variable arc response control for adjusting the response time of the machine to changes in arc voltage. The electrical control system completely eliminates the problems encountered in mechanically adjusted inductors with the moving parts carrying high currents and the like.

Generally, the operation of the illustrated single phase arc welding system is summarized as follows. The primaries 15 and 16 of the main transformer 10 are connected to the incoming power lines through a manual on-off switch or the like, not shown. The primary windings 15 and 16 are interconnected in series or parallel depending upon the incoming voltages as previously discussed. The switch arms 22 and 23 which are ganged to provide corresponding positioning are preset to a selected one of taps 20 and 21, respectively, to provide a coarse voltage control setting thereby establishing the minimum desired open circuit voltage and slope of the arc current and voltage characteristic. The voltage will be selected in accordance with the particular arc welding process. The tap 27 on the autotransformer 25 is adjusted to energize booster transformer 11 and provide a fine adjustment to a desired open circuit voltage.

In each of the settings of the switch arms 22 and 23, the open circuit voltage is established with a constant or single slope characteristic, that is, with the change in amperage with voltage at a predetermined linear relationship. The insertion of the booster transformer 11 does not vary the slope of this characteristic but merely shifts the curve thereof in a substantially parallel manner to a higher position in accordance with the voltage added to the circuit. Thus, addition of the booster transformer results in a higher open circuit voltage and a corresponding higher voltage at all other outputs.

The output of the main transformer 10 and the booster transformer 11 are connected in series as previously described and rectified by the rectifying elements 12 and 13 to establish a full wave rectified output between center tap 19 and the common lead 31. During one half of the input cycle when the left end or tap 21 of the main secondary 18, as shown in FIG. 1, is positive with respect to the right end, current flows from the positive terminal through the booster transformer winding 30 and rectifier 13 to the corresponding D.C. output lead 4 to and through the control unit 14, electrode 3, arc 6 and work 2 and back to the center tap 19. The current from the right end or tap 20 which is a relatively negative potential is blocked by the rectifying element 12. The half cycle of the input current flows through the load windings 34 and 35 of the saturable magnetic arc control unit 14 and also charges capacitor 42 which serves to smooth half cycle into a relatively constant direct voltage. During the following half cycle, taps 20 of the main transformer are positive relative to taps 21 and the current flows from the corresponding tap 20, the booster transformer winding 29, the rectifying element 12 and then, in the same path as the initial half cycle, through control unit 14, electrode 3, arc 6, work 2 and back to center tap 19. The current pulse also charge capacitor 42. The power supply produces a pulsed direct current with the capacitor 42 and the windings 34 and 35 filtering the direct current to produce an essentially constant direct current.

Further, if the arc voltage varies for any reason, the current varies to compensate therefor and re-establish the predetermined characteristic. The response time is controlled by the inductance of windings 34 and 35 which is determined by the setting of tap 40 of potentiometer 38. The arc response control is continuously adjustable from a relatively slow to a practically instantaneous arc response in the order of .0001 seconds.

The capacitor 42 is particularly provided because of the high amount of ripple in the output voltage of the single phase rectified output. If a three phase power source is employed, the ripple is substantially reduced and the necessity of capacitor correspondingly reduced. In a three phase system, the control unit determines the arc response and the adjustable direct arc voltage feedback maintains the self adjustment for variation in arc voltage.

Although the electrically controlled arc control unit 14 may take many forms, a preferred construction providing optimum control operation is shown in FIG. 2. The corresponding elements shown in FIG. 1 are similarly numbered in FIG. 2 for simplicity and clarity of explanation.

Referring particularly to FIG. 2, the magnetic core 36 is shown as a three-legged closed core although other configurations might be employed providing a closed outer loop portion 43 having the load windings 34 and 35 wound in opposite directions thereon to establish at any instance a similarly directed flux shown by the solid flux lines 44 through the closed loop portion 43. A bridging portion 45 of the core 36 is interposed bridging the loop portion between the position of windings 34 and 35. The saturating control winding 37 is wound on the central bridging portion and connected to the potentiometer 38 and therefore to the output of the power source, as previously described. Winding 37 establishes a unidirectional flux through bridging portion 45, shown by the dashed flux lines 46. The core 36 is preferably formed as an integral continuous unit without air gaps, as shown in FIG. 2.

In the control unit shown in FIG. 2, the magnetic flux 44 is essentially restrained to the outer continuous loop portion as a result of the opposite windings of the windings 34 and 35 as illustrated. Thus, the windings 34 and 35 are of the same number of turns and establish opposite magnetomotive forces across the bridging portion 45. The unidirectional flux 46 of winding 37 divides and passes in opposite directions through the closed loop portion 43 carrying windings 34 and 35. Thus, in the portion carrying winding 34, the flux 46 opposes the flux 44 whereas in the right hand portion carrying winding 35, the flux 46 aids the flux 44. This has been found to provide a highly satisfactory electrically actuated magnetic control unit providing a wide range of arc response settings.

The present invention has been found to provide a satisfactory power supply for both the sixty (60) cycle power system employed in the United States and the fifty (50) cycle power system employed in certain other countries by modifying the iron core of the main transformer to compensate for this difference but without necessarily changing the circuitry and other components.

The present invention thus provides an improved, continuously adjustable arc control unit for adjusting of the welding circuit to the precise characteristic required for any one of various arc processes. The apparatus is relatively simple and has a long, reliable life particularly as a result of the elimination of high or load current carrying components which must be adjusted in the presence of the arc.

Various modes of carrying out the invention are contemplated as being within the scope of the following claims particularly pointing out and distinctly claiming the subject matter which is regarded as the invention.

I claim:

1. Apparatus for direct current arc welding apparatus comprising, in combination,
    (a) an adjustable direct current power source having output lines supplying a direct current at a suitable voltage and current to an arc, and
    (b) a saturable reactance control unit having a pair of load windings reversibly wound on a continuous magnetic loop member and connected in series with each other and the output lines for connection in series with the arc and saturating control windings adapted to be connected to a direct current source, the energization of the control windings determining the arc response period of the arc welding system.

2. In direct current arc welding apparatus comprising, in combination,
    (a) an adjustable constant potential direct current power source having output lines supplying a direct current at a suitable voltage and current to an arc, and
    (b) a saturable reactor having a pair of load windings reversibly wound on a continuous magnetic loop core to opposite sides of a continuous bridging portion and connected in series with each other and the output lines for connection in series with the arc, said reactor having a saturating winding means wound on the bridging portion to adjust the saturation of the magnetic loop core.

3. In a direct current arc welding apparatus,
    (a) an adjustable constant potential direct current power source having output lines adapted to supply a direct current at a suitable voltage and current to an arc,
    (b) a saturable reactor having load winding means connected in series with the output lines for connection in series with the arc and having a direct current control winding magnetically coupled to the load windings, and
    (c) adjustable voltage means connecting the control winding to said output lines to provide an adjustable saturation of the saturable reactor.

4. In a direct current arc welding apparatus,
    (a) an adjustable constant potential direct current power source having output lines adapted to supply a direct current at a suitable voltage and current to an arc,
    (b) a saturable reactor having load winding means connected in series with the output lines for connection in series with the arc and having a direct current control winding magnetically coupled to the load windings,
    (c) adjustable voltage means connecting the control winding to said output lines to provide an adjustable saturation of the saturable reactor, and
    (d) a capacitor connected across the output lines to the power source side of the load winding means.

5. The arc welding apparatus of claim 4 wherein said power source includes,
    (a) a single phase transformer having a center tapped secondary and a primary adapted to be connected to an alternating current input, and
    (b) a pair of half wave rectifying circuits connected one each across opposite halves of the center tapped secondary and connected across said output lines to transmit the alternate half cycles of the input to the transformer.

6. The arc welding apparatus of claim 5 having,
    (a) a booster transformer with a primary and a pair of secondaries connected one each in the two rectifying circuits, and (b) an autotransformer connecting the primary of said booster transformer to an alternating current input and having an adjustable contact means to adjust the input to the primary.

7. A direct current arc welding systems comprising, in combination,
(a) an adjustable constant potential direct current power source having output lines supplying a direct current at a suitable voltage and current to an arc, and
(b) a saturable reactor control having load winding means connected in series with one of the output lines and saturating winding means magnetically coupled to vary the reactance of the load winding means.

8. A direct current arc welding system,
(a) an adjustable constant potential direct current power source having output lines supplying a direct current at a suitable voltage and current to an arc, and
(b) a closed three-legged reactor core having a central leg and a pair of side legs, a pair of load windings oppositely wound one each on the side legs and connected in series with one of the output lines and a control winding wound on the central leg and adapted to be connected to a direct current source.

9. A direct current arc welding system,
(a) an adjustable constant potential direct current power source having output lines supplying a direct current at a suitable voltage and current to an arc,
(b) a closed three-legged reactor core having a central leg and a pair of side legs, a pair of load windings oppositely wound one each on the side legs and connected in series with one of the output lines and a control winding wound on the central leg and adapted to be connected to a direct current source, and
(c) a capacitor connected across the output lines to the power source side of the load windings.

10. In a direct current arc welding system,
(a) a constant potential transformer having a secondary with a center tap and a plurality of similarly located output taps to opposite sides of the center tap,
(b) a pair of ganged output taps selectively engageable one each with the output on opposite sides of the center tap,
(c) a booster transformer having a pair of secondaries and a primary,
(d) an autotransformer connected to the primary of the booster transformer to vary the input thereto,
(e) a first half wave rectifying means connected in series with one of the secondaries of the booster transformer and one of the ganged output taps,
(f) a second half wave rectifying means connected in series with the other of the secondaries of the booster transformer and the other of the ganged output taps,
(g) means connecting the output side of the rectifying elements to form an output terminal,
(h) a capacitor connected across the output terminals,
(i) a saturable control unit having load windings connected in series to the first output terminal and forming a welding terminal and a saturating winding means, said center tap constituting a second welding terminal, and
(j) adjustable means connecting the saturating winding means between said welding terminals.

11. The direct current arc welding system of claim 10, wherein said saturable control unit comprises,
(a) a closed magnetic core having a first continuous loop portion and a continuous bridging portion,
(b) a pair of load windings connected in series and oppositely wound on the loop portion, one each on opposite sides of the bridging portion,
(c) a saturating winding wound on the bridging portion, and
(d) said adjustable means includes a potentiometer adjustably connected to the saturating winding and connected to the welding terminals for adjusting the arc response period of the welding system.

References Cited by the Examiner
UNITED STATES PATENTS

| | | | |
|---|---|---|---|
| 1,625,282 | 4/1927 | Requa | 323—89 X |
| 2,951,972 | 9/1960 | Pomazal | 219—131 X |
| 3,054,884 | 9/1962 | Manz et al. | 219—131 |
| 3,150,312 | 9/1964 | Willecke et al. | 323—89 |

ANTHONY BARTIS, *Acting Primary Examiner.*

JOSEPH V. TRUHE, *Examiner.*